US011505110B2

(12) United States Patent
Mochizuki et al.

(10) Patent No.: US 11,505,110 B2
(45) Date of Patent: Nov. 22, 2022

(54) VEHICLE HEAD LAMP

(71) Applicant: KOITO MANUFACTURING CO., LTD., Tokyo (JP)

(72) Inventors: Kiyotaka Mochizuki, Shizuoka (JP); Naoki Tatara, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/280,433

(22) PCT Filed: Sep. 10, 2019

(86) PCT No.: PCT/JP2019/035542
§ 371 (c)(1),
(2) Date: Mar. 26, 2021

(87) PCT Pub. No.: WO2020/066599
PCT Pub. Date: Apr. 2, 2020

(65) Prior Publication Data
US 2022/0001790 A1  Jan. 6, 2022

(30) Foreign Application Priority Data
Sep. 28, 2018 (JP) .............................. JP2018-185478

(51) Int. Cl.
*B60Q 1/04* (2006.01)
*F21S 41/67* (2018.01)
(Continued)

(52) U.S. Cl.
CPC ............ *B60Q 1/0408* (2013.01); *F21S 41/62* (2018.01); *F21S 41/67* (2018.01); *F21S 41/686* (2018.01); *F21W 2102/13* (2018.01)

(58) Field of Classification Search
CPC .......... F21S 41/67; F21S 41/675; F21S 41/62; F21S 41/686; B60Q 1/0408; B60Q 1/0041; B60Q 2400/50
See application file for complete search history.

(56) References Cited

U.S. PATENT DOCUMENTS

| 9,862,311 B2* | 1/2018 | Kiriyama ............ B60R 25/2054 |
| 2007/0102214 A1* | 5/2007 | Wittorf .............. G06K 9/00805 |
|  |  | 180/167 |

(Continued)

FOREIGN PATENT DOCUMENTS

| EP | 2559935 A1 | 2/2013 |
| EP | 2 772 682 A2 | 9/2014 |

(Continued)

OTHER PUBLICATIONS

English Machine Translation of Mori (JP 201781420) (Year: 2017).*
(Continued)

*Primary Examiner* — Zheng Song
(74) *Attorney, Agent, or Firm* — Sughrue Mion, PLLC

(57) ABSTRACT

Each of a pair of left and right vehicle head lamps includes a plurality of optical units in a lamp chamber. A variable light distribution type optical unit that changes a light distribution mode of a high beam depending on a surrounding state and a traveling state of a vehicle is disposed in a first vehicle head lamp on a passenger seat side, and a figure drawing optical unit capable of forming a desired figure on a road surface in front of the vehicle by emitted light is disposed at a position symmetrical to the variable light distribution type optical unit in a second vehicle head lamp on a driver seat side.

10 Claims, 21 Drawing Sheets

(51) Int. Cl.
*F21S 41/686* (2018.01)
*F21S 41/62* (2018.01)
*F21W 102/13* (2018.01)

(56) References Cited

U.S. PATENT DOCUMENTS

| | | | | |
|---|---|---|---|---|
| 2009/0116259 | A1* | 5/2009 | Ohshio | F21S 41/698 |
| | | | | 362/512 |
| 2010/0017111 | A1* | 1/2010 | Stefani | B60Q 1/50 |
| | | | | 353/121 |
| 2012/0044090 | A1* | 2/2012 | Kahler | B60Q 1/50 |
| | | | | 340/905 |
| 2015/0085514 | A1* | 3/2015 | Yagi | F21S 41/16 |
| | | | | 362/538 |
| 2017/0305332 | A1* | 10/2017 | Albou | B60Q 1/525 |
| 2018/0004020 | A1* | 1/2018 | Kunii | B60Q 1/34 |
| 2018/0186283 | A1* | 7/2018 | Fischer | G07C 5/008 |
| 2018/0209605 | A1 | 7/2018 | Ichikawa | |
| 2018/0334089 | A1* | 11/2018 | Huang | B60Q 5/006 |
| 2019/0322209 | A1* | 10/2019 | Sugiyama | F21S 41/43 |
| 2019/0389368 | A1* | 12/2019 | Yasuda | G03B 21/142 |
| 2020/0207258 | A1* | 7/2020 | Tezuka | B60Q 1/32 |

FOREIGN PATENT DOCUMENTS

| | | |
|---|---|---|
| EP | 3043108 A1 | 7/2016 |
| EP | 3210825 A1 | 8/2017 |
| FR | 3043168 A1 | 5/2017 |
| JP | 2009-117067 A | 5/2009 |
| JP | 2014-165130 A | 9/2014 |
| JP | 2015-64964 A | 4/2015 |
| JP | 2017-81420 A | 5/2017 |
| JP | 2018-107039 A | 7/2018 |
| JP | 2018-118556 A | 8/2018 |

OTHER PUBLICATIONS

English Machine Translation of Komatsu (JP 2014165130) (Year: 2014).*
English Machine Translation of Ichikawa (JP 2018118556) (Year: 2018).*
International Search Report (PCT/ISA/210) issued by the International Searching Authority in International Application No. PCT/JP2019/035542, dated Nov. 11, 2019.
Written Opinion (PCT/ISA/237) issued by the International Searching Authority in International Application No. PCT/JP2019/035542, dated Nov. 19, 2019.
Communication dated Oct. 15, 2021 issued by the European Patent Office in application No. 19864275.3.

* cited by examiner

VEHICLE HEAD LAMP

CROSS-REFERENCE TO RELATED APPLICATION

This application is a National Stage of International Application No. PCT/JP2019/035542 filed on Sep. 10, 2019 claiming priority from Japanese Patent Application No. 2018-185478 filed on Sep. 28, 2018 and the disclosures of which are incorporated herein in their entirety by reference.

TECHNICAL FIELD

The present invention relates to a vehicle head lamp that is equipped on the front of a vehicle and radiates light.

BACKGROUND ART

A vehicle lamp is disclosed in which an optical unit having a variable light distribution function and an optical unit having a road surface drawing function are equipped to form a variable light distribution and a predetermined figure on a road surface (Patent Literature 1).

CITATION LIST

Patent Literature

PATENT LITERATURE 1: JP-A-2014-165130

SUMMARY OF INVENTION

Technical Problem

However, Patent Literature 1 does not refer to disposition of each optical unit. The present invention has been made in view of this, and an object thereof is to provide a vehicle head lamp in which a plurality of optical units are provided and each optical unit is appropriately disposed.

Solution to Problem

In order to achieve the above object, a vehicle head lamp of an aspect of the present invention is a pair of left and right vehicle head lamps each including a plurality of optical units in a lamp chamber, in which a variable light distribution type optical unit that changes a light distribution mode of a high beam depending on a surrounding state and a traveling state of a vehicle is disposed in a first vehicle head lamp on a passenger seat side, and a figure drawing optical unit capable of forming a desired figure on a road surface in front of the vehicle by emitted light is disposed at a position symmetrical to the variable light distribution type optical unit in a second vehicle head lamp on a driver seat side. According to this aspect, an influence of pitching can be reduced by drawing a road surface from the driver seat side substantially in front.

In an aspect, the plurality of optical units of the first vehicle head lamp may be disposed so as to be symmetrical to the plurality of optical units of the second vehicle head lamp. According to this aspect, the first vehicle head lamp and the second vehicle head lamp are bilaterally symmetrical in a front view, which has a good appearance.

In an aspect, an optical axis of the figure drawing optical unit may be set below a horizontal axis of a virtual screen, and an optical axis of the variable light distribution optical unit may be set above a horizontal axis of the virtual screen. According to this aspect, the figure drawing optical unit can draw a road surface, and the variable light distribution type optical unit can form a variable high beam light distribution.

In another aspect, an optical axis of the figure drawing optical unit may be set above a vertical axis of the virtual screen, and an optical axis of the variable light distribution optical unit may be set toward a driver seat side from the vertical axis of the virtual screen. According to this aspect, glare of a road shoulder wall on an own lane side and relative darkness on an opposite lane side can be prevented, and brightness can be made uniform as a whole.

In another aspect, the figure drawing optical unit and the variable light distribution type optical unit are reflection devices whose surfaces are provided with a plurality of reflection elements arranged in a matrix form, and the reflection elements are capable of selectively reflecting incident light individually. According to this aspect, the left and right head lamps can have the same configuration.

In another aspect, a number of reflection elements of the figure drawing optical unit may be larger than a number of reflection elements of the variable light distribution optical unit.

In another aspect, an irradiation range of the figure drawing optical unit on the virtual screen may be narrower than an irradiation range of the variable light distribution optical unit on the virtual screen.

In another aspect, a figure formed on the virtual screen by the figure drawing optical unit may have higher luminance than luminance of a figure formed on the virtual screen by the variable light distribution optical unit.

In another aspect, luminance of a light source constituting the figure drawing optical unit may be higher than luminance of a light source constituting the variable light distribution optical unit. According to the above configuration, a figure drawn on a road surface can be made bright and clear, and higher attention can be called to the driver.

In another aspect, a low beam light distribution optical unit forming a low beam light distribution pattern and a second variable light distribution type optical unit forming a high beam light distribution pattern may be further disposed in the first vehicle head lamp and the second vehicle head lamp respectively. According to this aspect, a plurality of optical units that form the high beam light distribution can be arranged, and the high beam light distribution pattern can have a high luminous intensity.

Advantageous Effects of Invention

As is clear from the above description, according to the present invention, it is possible to provide a vehicle head lamp in which optical units are appropriately arranged.

DESCRIPTION OF EMBODIMENTS

Hereinafter, suitable embodiments of the present invention are described with reference to the drawings. The embodiments are exemplification rather than limiting the invention, and all features and combinations thereof described in the embodiments are not necessarily essential to the invention.

In each drawing, directions of a vehicle and a vehicle head lamp assumed to be viewed from a driver seat of the vehicle by a driver is described as (upper: lower: left: right: front: rear=Up: Lo: Le: Ri: Fr: Re).

First Embodiment

Figure 1:
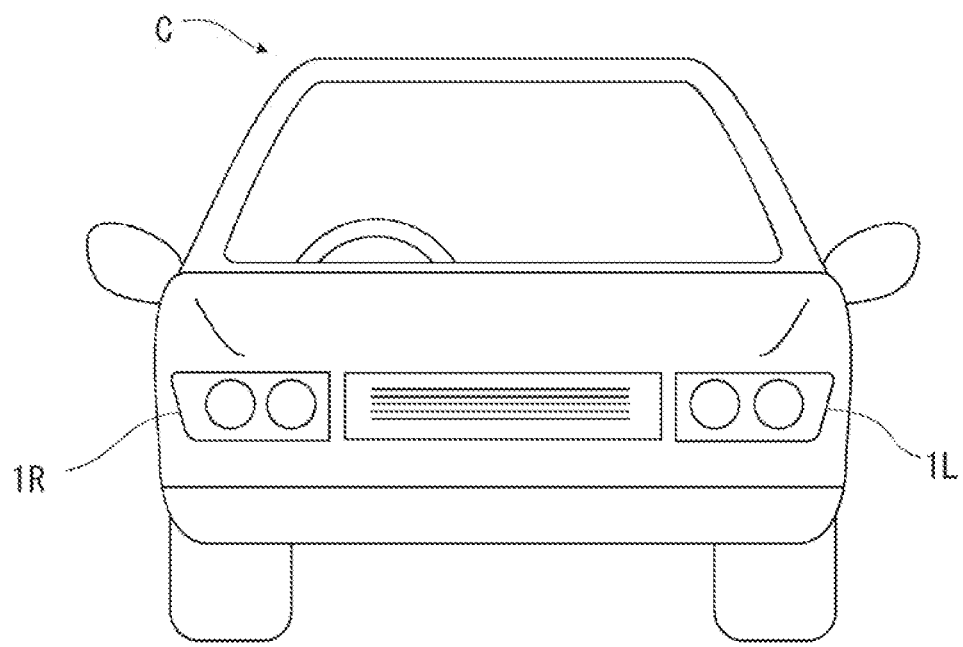
FIG. 1 is a front view of a vehicle equipped with a vehicle head lamp according to a first embodiment.
Figure 1:
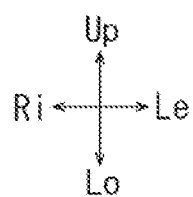

A vehicle C shown in FIG. 1 includes a right head lamp 1R and a left head lamp 1L. The right head lamp 1R and the left head lamp 1L are a pair of left and right vehicle head lamps. In the present embodiment, the vehicle C is a right handle specification, and the right head lamp 1R (an example of a second vehicle head lamp) is equipped on a right side of the vehicle C which is a driver seat side, and the left head lamp 1L (an example of a first vehicle head lamp) is equipped on a left side of the vehicle C which is a passenger seat side.

Figure 2:
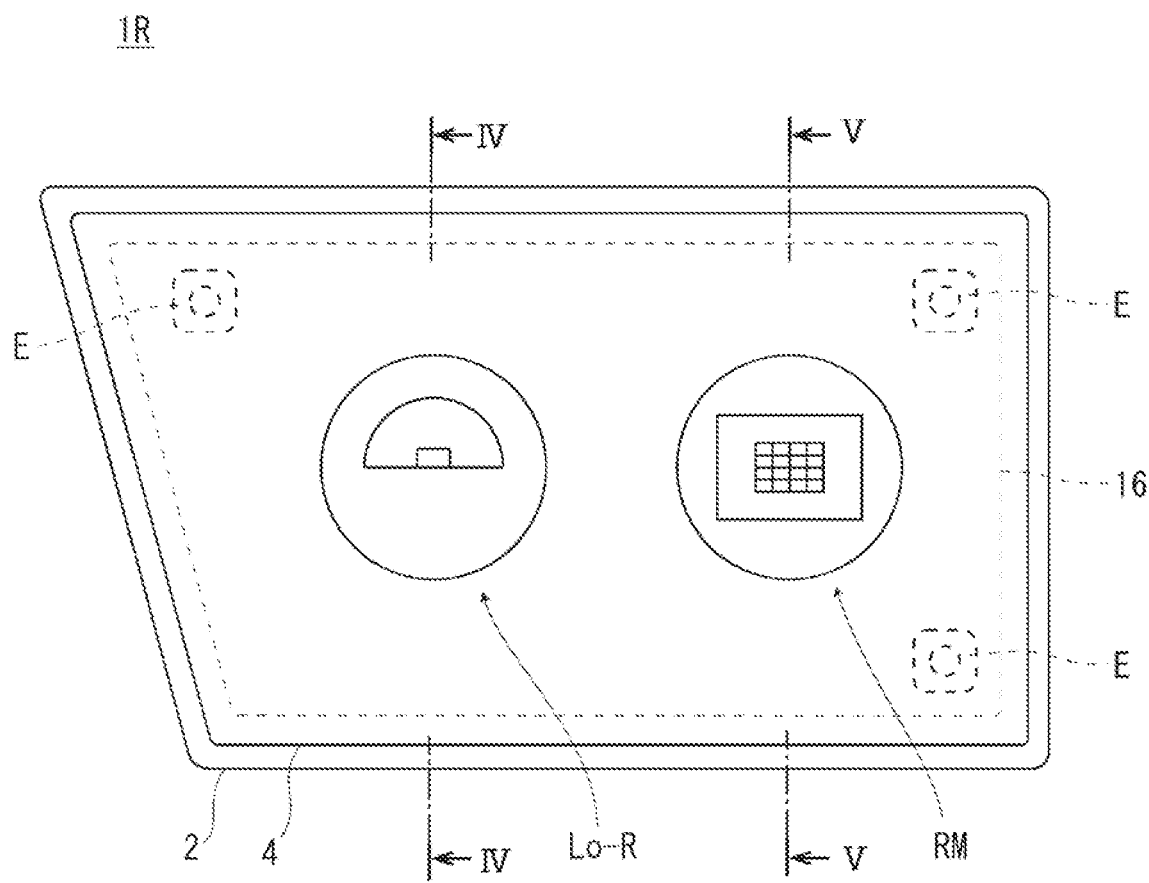
FIG. 2 is a front view of the vehicle head lamp (driver seat side) according to the first embodiment.
Figure 3:
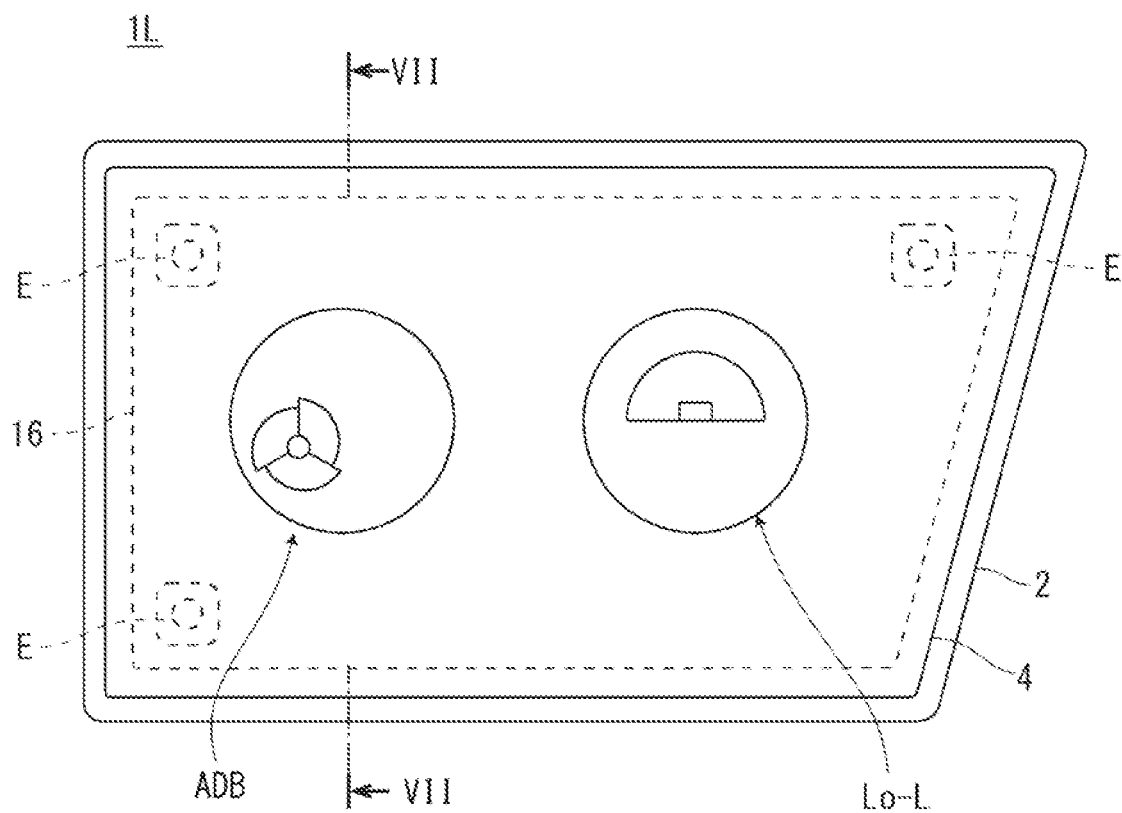
FIG. 3 is a front view of the vehicle head lamp (passenger seat side) according to the first embodiment.
Figure 3:
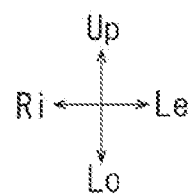

As shown in FIG. 2 and FIG. 3, each of the right head lamp 1R and the left head lamp 1L includes a lamp body 2 having an opening portion in the front of the vehicle C and a front cover 4 formed of a light transmissive resin, glass, or the like which is installed on the opening portion of the lamp body 2. A lamp chamber is formed inside the lamp body 2 and the front cover 4.

A figure drawing optical unit RM and a low beam optical unit Lo-R are housed in the lamp chamber of the right head lamp 1R in an order from a vehicle width direction inner side (left).

A variable light distribution type optical unit ADB and a low beam optical units Lo-L are housed in the lamp chamber of the left head lamp 1L in an order from a vehicle width direction inner side (right).

The right head lamp 1R and the left head lamp 1L have a bilaterally symmetrical external form, and optical units provided therein, namely the left and right low beam optical units Lo-R and Lo-L and the figure drawing optical unit RM and the variable light distribution type optical unit ADB are disposed at bilaterally symmetrical positions.

Each optical unit of the right head lamp 1R and the left head lamp 1L is installed on the support members 16 respectively. The support member 16 is installed on the lamp body 2 by aiming screws E. Optical axes of the right head lamp 1R and the left head lamp 1L are adjusted in a horizontal direction and a vertical direction by rotating respective aiming screws E.

An extension reflector 5 disposed inside each head lamp has an opening portion, and a projection lens of each optical unit is exposed forward from the opening portion. The extension reflector 5 blindfolds a mechanism part of each optical unit other than the projection lens.

(Low Beam Light Distribution Optical Unit)

Next, each optical unit is described.

Figure 4:
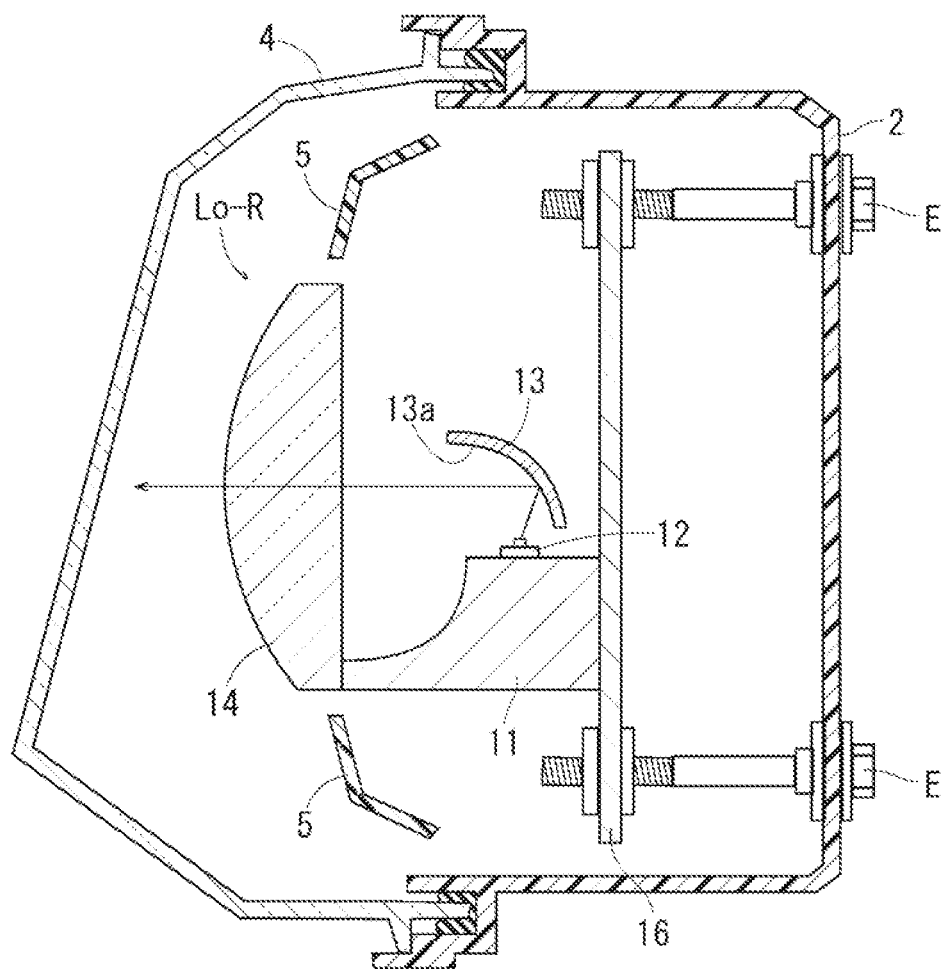
FIG. 4 is a cross-sectional view taken along a line IV-IV of FIG. 2 and an illustrative view illustrating a configuration of a low beam optical unit.

The low beam optical unit Lo-R is configured to irradiate a front of the vehicle C with a low beam, and includes a light source 12 as a light emitting element, a reflector 13, and a transparent or translucent projection lens 14 as shown in FIG. 4. The light source 12 and the projection lens 14 are installed on a metallic bracket 11 fixed to the support member 16. The reflector 13 is installed on the support member 16 via a fixing member (not shown).

As the light source 12, a semiconductor light emitting element such as a light emitting diode (LED), a laser diode (LD), or an electro luminescence (EL) element, a lamp bulb, an incandescent lamp (halogen lamp), a discharge lamp, and the like can be used.

The reflector 13 is configured to guide the light emitted from the light source 12 to the projection lens 14, and an inner surface thereof is a predetermined reflective surface 13a.

The projection lens 23 is formed of, for example, a free-form surface lens of which a front side surface and a rear side surface have a free-form surface shape.

Light emitted from the light source 12 is reflected forward by the reflective surface 13a of the reflector 13, passes through the projection lens 14 and the front cover 4 and is emitted forward, and forms a low beam light distribution pattern in front of the vehicle C.

In the present embodiment, a projector type optical unit is used as the low beam optical unit Lo-R, but the present invention is not limited thereto, and an optical unit having a configuration known in the related art such as a reflector may be used, and the type of the optical unit is not limited.

A low beam light distribution pattern is formed in front of the vehicle C by the low beam optical units Lo-R and Lo-L.

Since the low beam optical unit Lo-L has the same configuration as the low beam optical unit Lo-R, description thereof is omitted. If the low beam light distribution pattern is formed, the low beam optical unit Lo-L may have a configuration different from that of the low beam optical unit Lo-R.

(Figure Drawing Optical Unit)

Figure 5:
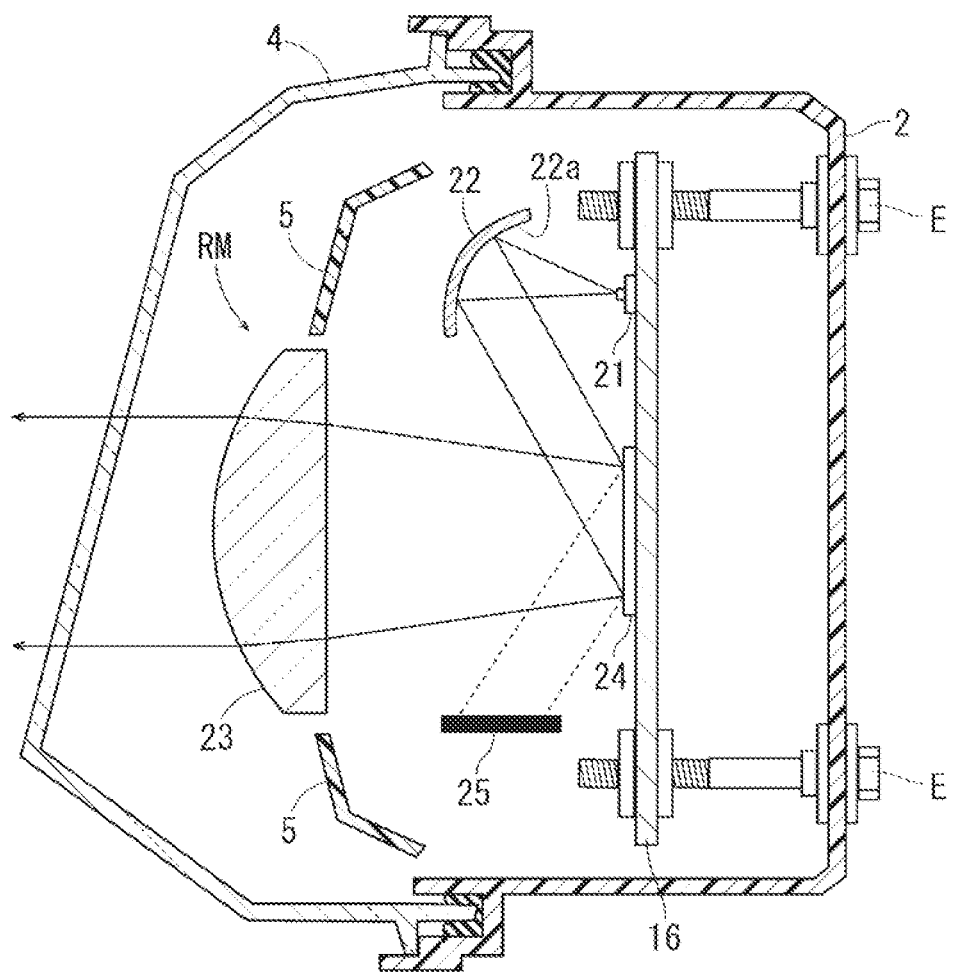
FIG. 5 is a cross-sectional view taken along a line V-V of FIG. 2 and an illustrative view for illustrating a configuration of a figure drawing optical unit.
Figure 5:
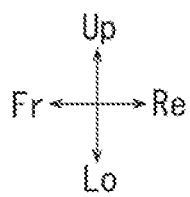

The figure drawing optical unit RM is configured to form a predetermined figure and light distribution with the light emitted to the front of the vehicle C, and includes a light source 21, a reflective optical member 22, a projection lens 23, a light deflection device 24 (an example of a reflection device), and a light absorption member 25 as shown in FIG. 5. The light source 21 and the light deflection device 24 are installed on the support member 16, and the remaining parts are installed on the support member 16 by a support member (not shown).

The light source 21 is an LED. In order to guide more light of the light source 21 to the reflective optical member 22, the light source 21 may be provided with a condensing member such as a convex lens.

The reflective optical member 22 is configured to guide the light emitted from the light source 21 to a reflective surface of the light deflection device 24, and an inner surface thereof is a predetermined reflective surface 22a. When the light emitted from the light source 21 is directly guided to the reflective surface of the light deflection device 24, the reflective optical member 22 may not be provided.

The light deflection device 24 is disposed on an optical axis of the projection lens 23, and is configured to selectively reflect the light emitted from the light source 21 to the projection lens 23.

In the light deflection device 24, a plurality of micro mirror elements (an example of a reflection element) such as micro electromechanical systems (MEMS) are arranged in a matrix form. A reflection direction of the light emitted from the light source 21 can be selectively changed by controlling angles of reflective surfaces of the plurality of mirror elements respectively. That is, part of the light emitted from the light source 21 can be emitted toward the projection lens 23, and the other light can be reflected toward a direction in which the light is not effectively used as distributed light. Here, the direction in which the light is not effectively used can be taken as, for example, a direction in which an influence of the reflective light is small (a direction that hardly contributes to formation of a desired light distribution pattern) or a direction toward the light absorption member (shield member), and refers to a direction toward the light absorption member 25 in the present embodiment.

The projection lens 23 projects a light source image formed on a rear focal plane including a rear focal point of the projection lens 23 onto a virtual vertical screen in front of the right head lamp 1R as an inverted image. The projection lens 23 is disposed such that the rear focal point is located on the optical axis of the figure drawing optical unit RM and near the reflection surface of the light deflection device 24.

A surface of the light absorption member 25 is subjected to non-reflective coating, and the light absorption member 25 absorbs the reflective light from the light deflection device 24 without reflection or transmission.

The light emitted from the light source 21 is reflected by the reflective surface 22a of the reflective optical member 22 to the light deflection device 24, and part of the light is reflected forward by the light deflection device 24 (the other light is reflected toward the light absorption member 25 and absorbed), passes through the projection lens 23 and the front cover 4, and is emitted to the front of the vehicle.

(Light Deflection Device)

The light deflection device 24 is described in detail.

Figure 6A:
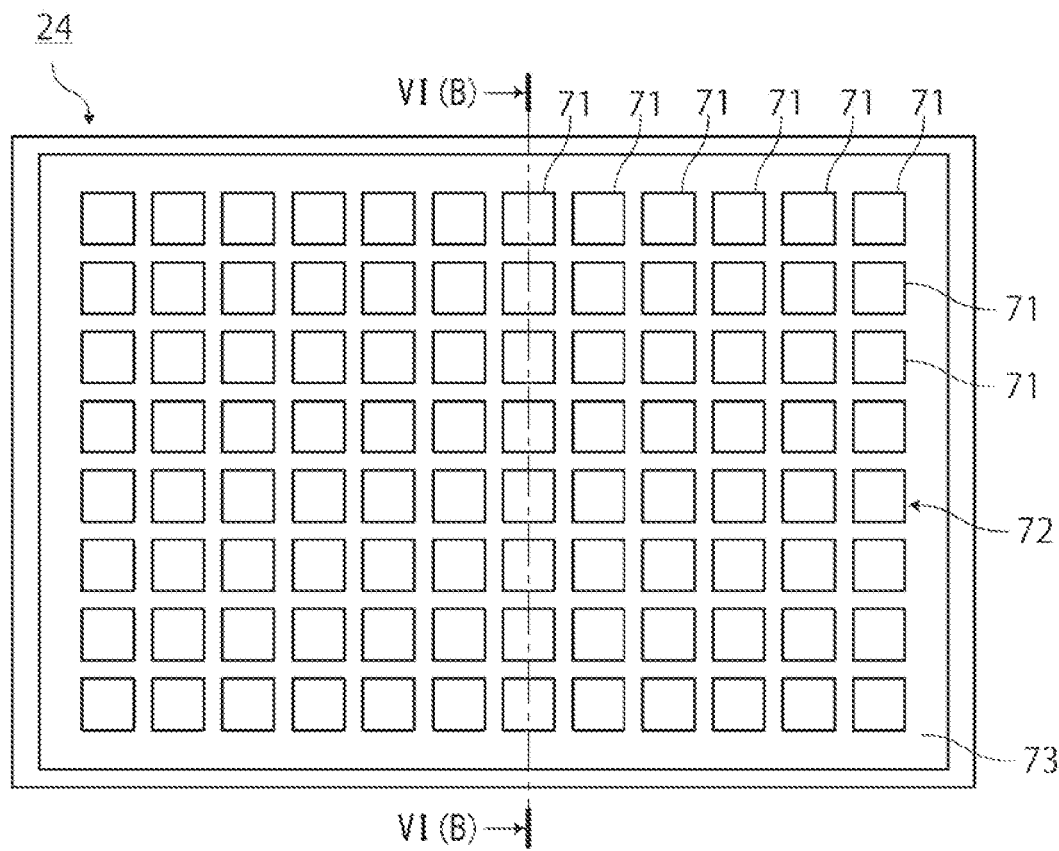
FIG. 6A is a front view showing a schematic configuration of a light deflection device.

As shown in FIG. 6A, the optical deflection device body 24 includes a micro mirror array 72 in which a plurality of minute mirror elements 71 are arranged in a matrix form. The mirror element 71 is a quadrilateral (a square, a rhombus, a rectangle, a parallelogram, or the like), and has a reflective surface 71a that reflects light on a surface thereof. The light deflection device 24 includes a transparent cover material 73 such as glass or plastic disposed on a front side of the reflective surface 71a of the mirror element 71.

Figure 6B:
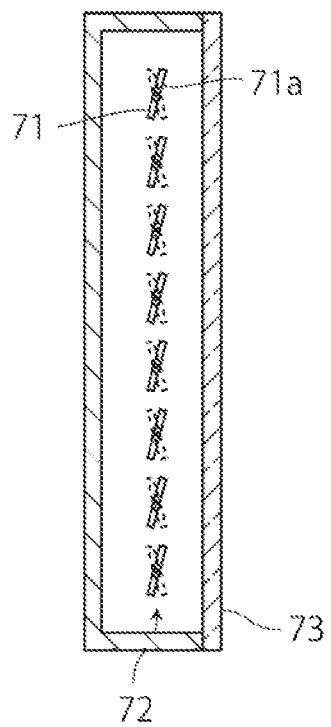
FIG. 6B is a cross-sectional view taken along a line VI(B)-VI(B) in FIG. 6A.

Each mirror element 71 of the micromirror array 72 is configured to be switchable between an ON state (a solid line position shown in FIG. 6B) as a first state in which light emitted from the light source 21 is reflected toward the projection lens 23 so as to be used as a desired light distribution pattern and an OFF state (a broken line position shown in FIG. 6B) as a second state in which light emitted from the light source 21 is reflected toward the light absorption member 25 so as not to be effectively used.

FIG. 5 shows reflective light (shown by a solid line) by the light deflection device 24 when the mirror element 71 of the light deflection device 24 is in the ON state and reflective light (shown by a broken line) when the mirror element 71 is in the OFF state.

Each mirror element 71 has a pivot axis at a position that substantially equally divides the mirror element 71. Each mirror element 71 is configured to be switchable between the ON state and the OFF state about the pivot axis.

By independently (individually) controlling the ON/OFF state of each mirror element 71 and selectively changing a reflection position of the light emitted from the light source 21, it is possible to obtain a desired projection image, reflection image, light distribution pattern, or the like.

In addition, although the control of the mirror element 71 is binary control of ON/OFF, gradation expression of light and darkness is possible by adjusting a time ratio of the ON/OFF state when switching of the ON/OFF state is performed at high speed or density of the mirror element 71 in the ON state by thinning out the mirror element 71 in the ON state in a certain region. That is, gradation of a projected image can be expressed in a gray scale.

When a projected image is expressed in color, light source units of three or more colors, such as red, green, and blue, are used in the light source 21 to irradiate the light deflection device 24 in a time division manner, and each mirror element 71 is turned on at a timing when the light deflection device 24 is irradiated with a color to be projected. Since the ON/OFF state of the mirror element 71 can be switched at a rate of several thousand times per second, the reflected light of each mirror element 71 is recognized as mixed light due to an illusion of a human eye (afterimage effect). Various color images can be expressed by combining lighting time of each color of the light source unit and the ON/OFF time ratio of the mirror element 71.

In the present embodiment, a digital mirror device (DMD) is used as the figure drawing optical unit RM, but other configurations may be used, such as a pixel optical device such as an LED array or a liquid crystal shutter, a scanning device that performs scanning with a laser beam at high speed to form an image by an afterimage.

(Variable Light Distribution Type Optical Unit)

Figure 7:
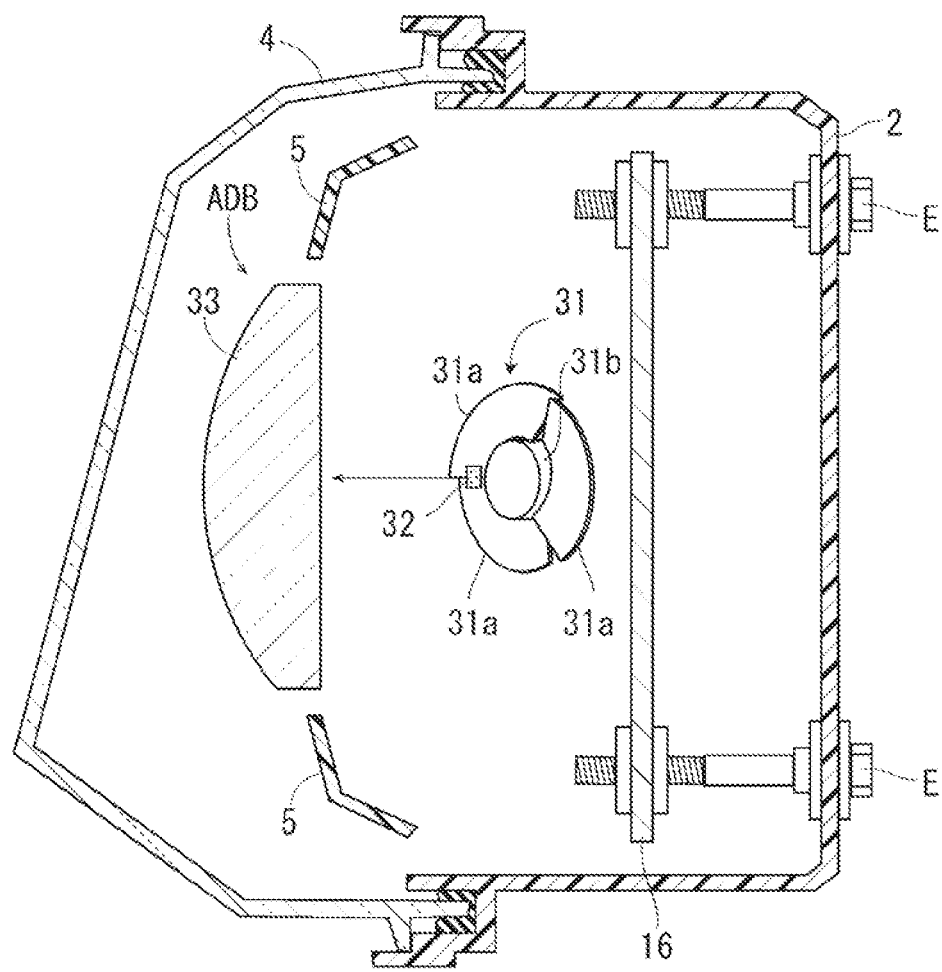
FIG. 7 is a cross-sectional view taken along a line VII-VII in FIG. 3 and an illustrative view for illustrating a configuration of a variable light distribution type optical unit.
Figure 7:
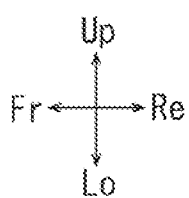

The variable light distribution type optical unit (high beam light distribution optical unit) ADB is configured to form a variable high beam light distribution in accordance with a driving condition and a surrounding state of the vehicle C, and includes a rotary reflector 31, a light source 32, and a projection lens 33 disposed in front of the rotary reflector 31 as shown in FIG. 7. Each part is installed on the support member 16 by a fixing member (not shown).

Figure 8:
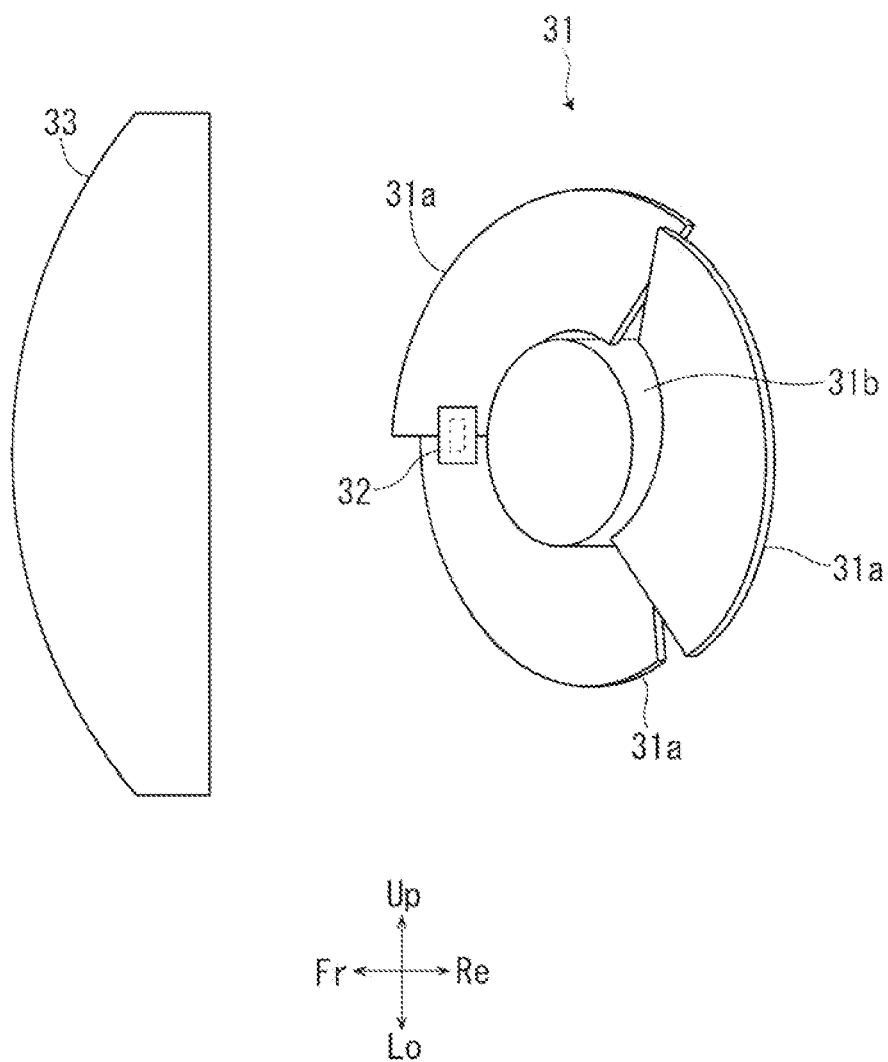
FIG. 8 is an enlarged view schematically showing the variable light distribution type optical unit.
Figure 9:
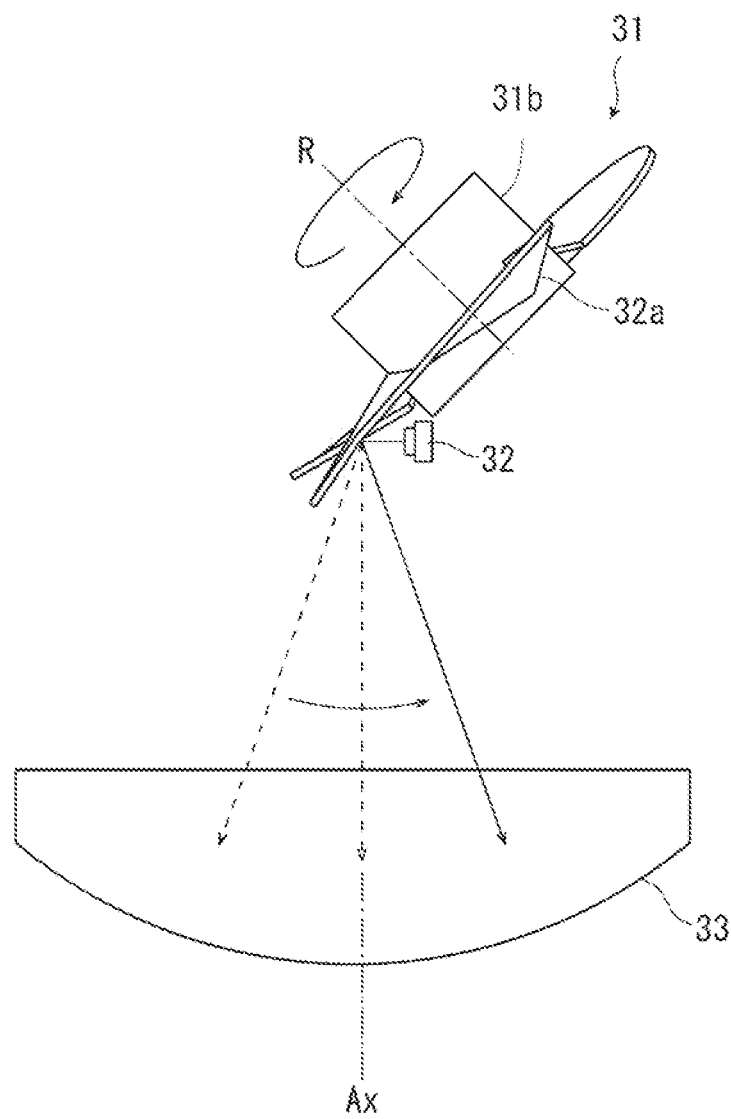
FIG. 9 is a plan view schematically showing the variable light distribution type optical unit.

FIG. 8 is an enlarged view of the variable light distribution type optical unit ADB, and FIG. 9 is a plan view of the variable light distribution type optical unit ADB. As shown in FIG. 9, the rotary reflector 31 is rotated in one direction about a rotation axis R by a drive source such as a motor (not shown). The rotary reflector 31 includes a reflective surface configured to reflect light emitted from the light source 32 while rotating and to form a desired light distribution pattern.

The rotary reflector 31 is provided with three blades 31a that have the same shape and function as reflective surfaces around a tubular rotation portion 31b. The rotation axis R of the rotary reflector 31 is oblique to an optical axis Ax, and is provided in a plane including the optical axis Ax and the light source 32. In other words, the rotation axis R is provided substantially parallel to a scanning plane of light (irradiation beam) of the light source 32 that performs scanning in a left-right direction by rotation. Here, the scanning plane can be taken as, for example, a fan-shaped plane formed by continuously connecting trajectories of light of the light source 32 which is scanning light.

A shape of a blade 31a of the rotary reflector 31 is configured such that a secondary light source of the light source 32 due to reflection is formed in the vicinity of a focal point of the projection lens 33. Further, the blade 31a has a twisted shape such that an angle formed between the optical axis Ax and the reflective surface changes as the blade 31a moves in a circumferential direction about the rotation axis R. Accordingly, the rotary reflector 31 can scan the front of the vehicle in the horizontal direction by using light of the light source 32.

With the configuration as described above, the variable light distribution type optical unit ADB reflects light of the light source 32 by the rotary reflector 31 and scans the front with the reflected light, so that a high beam light distribution pattern having an oblong shape in a substantially horizontal direction can be formed. Further, by synchronizing the timing of turning on and off the light source 32 and a luminous intensity change with rotation of the rotary reflector 31, it is possible to form a high beam light distribution pattern in which an optional region is shielded. That is, when a region including a pedestrian and a front traveling vehicle detected by various detection devices equipped on the vehicle C is scanned, the light source 32 is turned off in synchronization with a position of the rotary reflector 31 corresponding to the region, so that a shielding portion can be formed in the light distribution pattern with high accuracy.

In addition, when the high beam light distribution pattern is formed by changing (turning on and off) the luminous intensity of the light source 32 in synchronization with rotation of the rotary reflector 31, it is also possible to control the light distribution pattern itself to be swiveled or to form a plurality of shield portions by shifting a phase of the luminous intensity change.

In the present embodiment, the rotary reflector 31 is used in the variable light distribution type optical unit ADB, but as long as the variable light distribution type optical unit ADB has an adapting driving beam (ADB) function that makes the variable light distribution according to the surrounding state and a traveling state of the vehicle, other mechanisms known in the related art may be used, such as a light source unit having a swivel function, an LED array in which a plurality of light sources are arranged side by side, a pixel optical device represented by the above-described DMD, a scanning device that forms a desired light distribution by scanning with the light source, and the like.

(Block Diagram)

Figure 10:
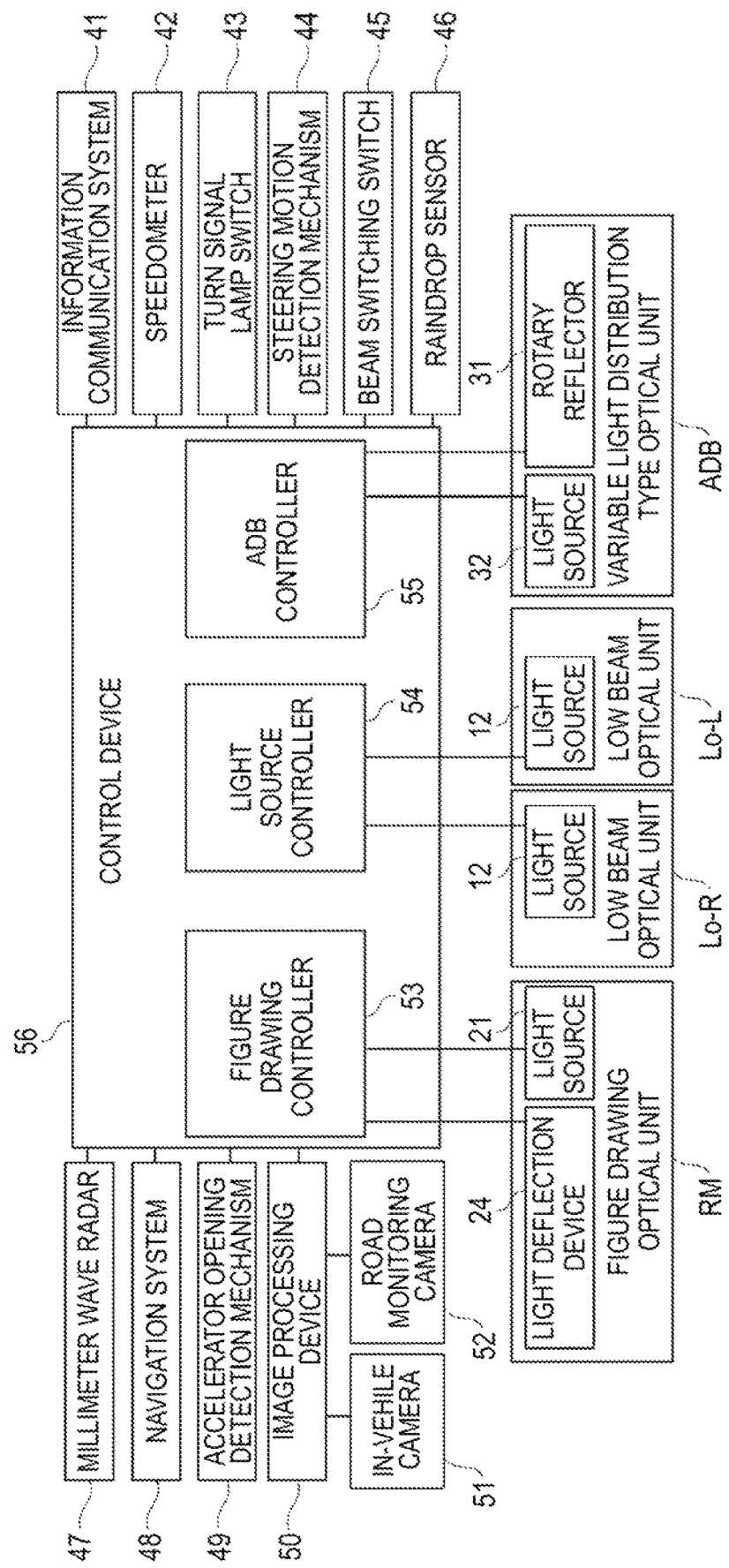
FIG. 10 is a block diagram illustrating a control device.

Next, a configuration of a control device of the left head lamp 1L and the right head lamp 1R is described using FIG. 10. The control device 56 includes elements or circuits commencing with a CPU or a memory of a computer as a hardware configuration, and is realized by a computer program or the like as a software configuration. A control program stored in the memory is executed in the CPU to generate various control signals.

The control device 56 includes a figure drawing controller 53, a light source controller 54, and an ADB controller 55.

The figure drawing controller 53 performs output intensity adjustment of the light source 21 of the figure drawing optical unit RM and ON/OFF control of each minor element 71 of the light deflection device 24.

The ADB controller 55 performs turning on and off of the light source 32 of the variable light distribution type optical unit ADB and rotation control of the rotary reflector 31.

The light source controller 54 controls turning on and off of each light source 12 of the low beam optical units Lo-R and Lo-L based on a signal from a beam switching switch 45.

A road information communication system 41, a speedometer 42, a turn signal lamp switch 43, a steering motion detection mechanism 44, the beam switching switch 45, a raindrop sensor 46, a millimeter wave radar 47, a navigation system 48, an accelerator opening detection mechanism 49, and an image processing device 50 are connected to the control device 56. A road monitoring camera 52 and an in-vehicle camera 51 are connected to the image processing device 50.

The road monitoring camera 52 includes an intersection camera disposed at an intersection, a monitoring camera which is installed beside a road and captures a road surface condition, a pedestrian, a vehicle such as a bicycle, a motorcycle, or an automobile, an obstacle, or the like on a moving image or a still image, or the like, and the in-vehicle camera 51 includes a camera equipped on the own vehicle or another vehicle and capturing surroundings of the vehicle on a moving image or a still image, or the like. The image processing device 50 is connected to the road monitoring camera 52 via a communication line such as the Internet, and acquires video and image data captured by the road monitoring camera 52. The image processing device 50 sends a video or the like captured by the in-vehicle camera 51, the road monitoring camera 52, or the like as analyzed data to the control device 56.

The road information communication system 41 receives data related to a road surface condition during traveling, such as a rainfall on a road during traveling and a freezing condition of the road via a communication line such as the Internet, and sends the data to the control device 56.

The turn signal lamp switch 43 detects a signal of which of the left and right turn signal lamps is turned on, the steering motion detection mechanism 44 detects a signal of which of left and right directions the steering is turned to, the speedometer 42 detects a traveling speed of the own vehicle, the accelerator opening detection mechanism 49 detects an accelerator step amount, the raindrop sensor 46 detects a signal related to the rainfall during traveling of the vehicle, and the millimeter wave radar 47 detects a distance and a relative speed to another vehicle or a pedestrian in a front-rear direction or on a lateral side of the vehicle C, and the data signals are sent to the control device 56.

The navigation system 48 sends a data signal related to a current position of the own vehicle to the control device 56 by having a GPS, map data, or the like (not shown).

The control device 56 grasps and analyzes a traveling state of the own vehicle and a surrounding state of the own vehicle, such as positions of an oncoming vehicle, a preceding vehicle, and a pedestrian, a position of a retroreflector such as a sign or a signboard, a road shape, and weather by the data signal received from the detection equipment, determines an appropriate light distribution pattern based on the states, and sends a control signal to the ABS controller 55. This makes it possible to perform optimum light distribution each time.

At the same time, the control device 56 determines a drawing figure such as a mark or a character for calling attention of a driver of the own vehicle or another vehicle, a pedestrian, or the like as necessary based on the above analysis, and sends a control signal to the figure drawing controller 53.

In other embodiments to be described later, a plurality of optical units having the same configuration may be provided, and in this case, the optical units having the same configuration are connected to the same controller and controlled in the same manner.

(Light Distribution and Road Surface Drawing Figure)

A light distribution and road surface drawing formed by the right head lamp 1R and the left head lamp 1L having the above-described configurations are described.

Figure 11:
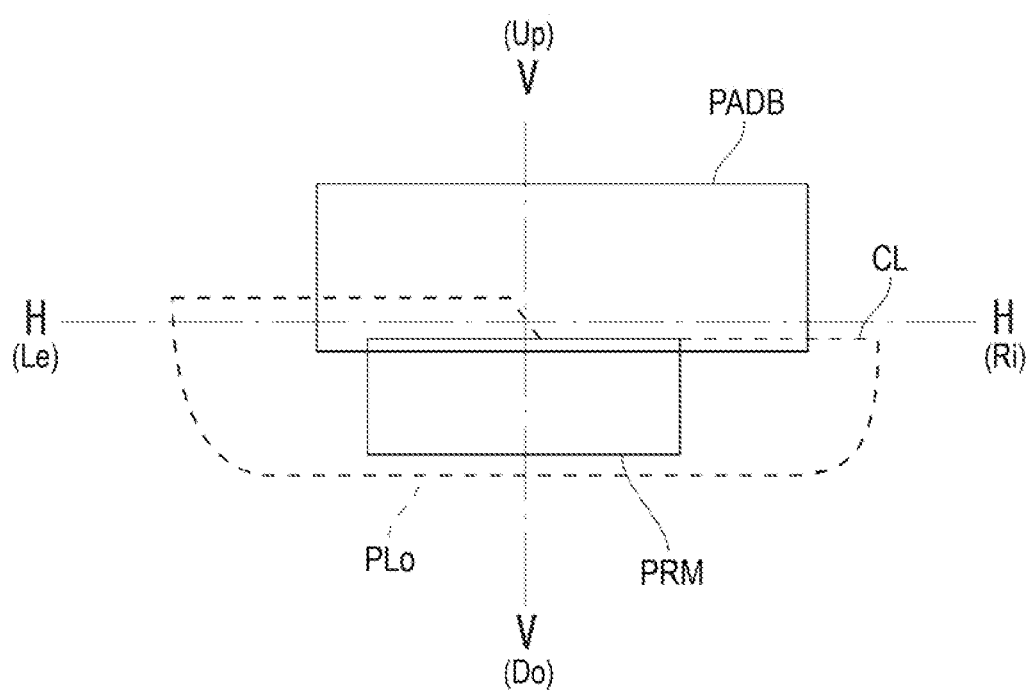
FIG. 11 is an image diagram of an irradiation range of the vehicle head lamp according to the first embodiment.

FIG. 11 is an image diagram of an irradiation range by the right head lamp 1R and the left head lamp 1L, and schematically shows an irradiation range of each optical unit formed on a virtual vertical screen disposed at a position 25 m in front of the head lamp by irradiation light from the right head lamp 1R and the left head lamp 1L. Hereinafter, the irradiation range refers to a range of irradiation on the virtual vertical screen. An optical axis of the optical unit is a straight line connecting curvature centers of front and rear surfaces of the projection lens, and a focal point is defined on the optical axis. In the present embodiment, the optical axis passes through a center of a rectangular irradiation range.

An irradiation range PLo shown in FIG. 11 is a combination of an irradiation range of the low beam optical unit Lo-R of the right head lamp 1R and an irradiation range of the low beam optical unit Lo-L of the left head lamp 1L, and mainly corresponds to a region below a horizontal line (H-H line) on the virtual vertical screen and a central region including a perpendicular line (V-V line), namely a low beam region.

An irradiation range PADB is an irradiation range of the variable light distribution type optical unit ADB. The variable light distribution type optical unit ADB is configured such that an optical axis thereof is above a horizontal line and is slightly rightward of the perpendicular line, and similarly, in the irradiation range PADB, a region corresponding to an upper region including the horizontal line and the slightly rightward central region including the perpendicular line, namely a high beam region is irradiated.

The irradiation range PRM is an irradiation range of the figure drawing optical unit RM. The figure drawing optical unit RM is configured such that an optical axis thereof is below the horizontal line in an upper-lower direction and substantially coincides with the perpendicular line in a left-right direction, and similarly, in the irradiation range PRM, a region below the horizontal line and a region that includes the perpendicular line and is equal on both sides are irradiated. The irradiation range PRM is narrower than the irradiation range PADB.

By setting the optical axis of the figure drawing optical unit RM below the horizontal line, the figure drawing optical unit RM can draw a predetermined figure or character on a road surface in front of the head lamp. The figure drawing optical unit RM may assist the low beam light distribution pattern as long as the optical axis thereof is below the horizontal line, and for example, as shown in FIG. 11, when an upper edge of the irradiation range PRM is aligned with a cut line CL, the cut line CL becomes clear. In addition, if the upper edge of the irradiation range PRM is above the horizontal line, the high beam light distribution may be assisted.

Figure 12A:
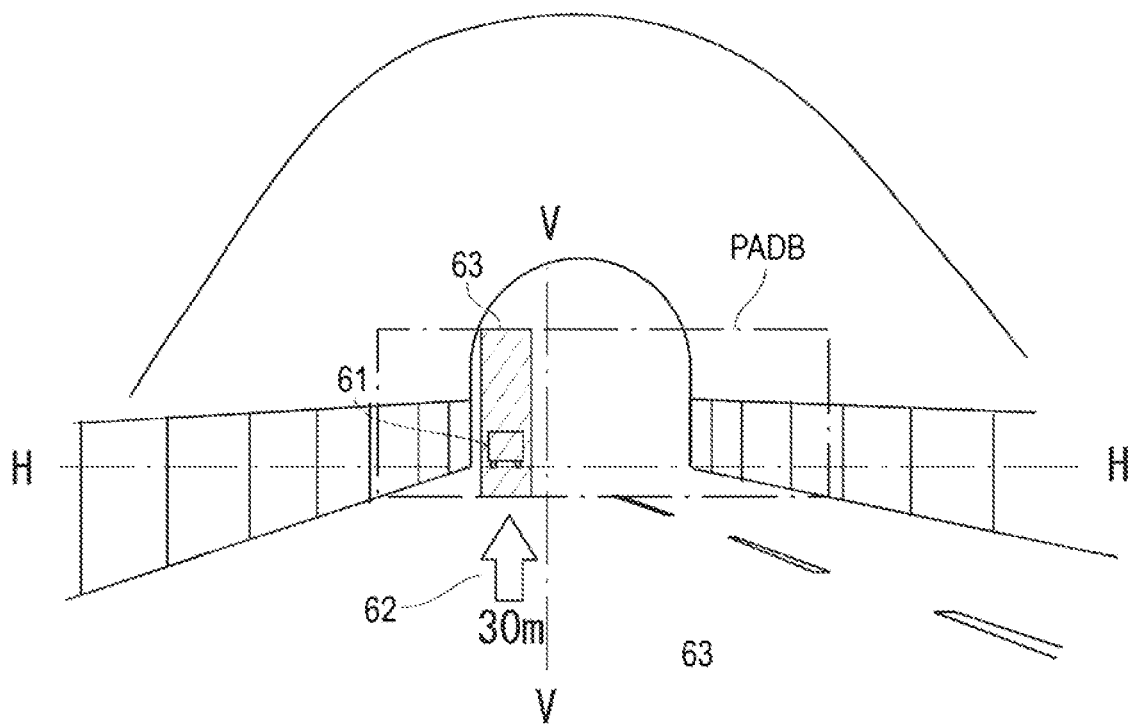
FIG. 12A is an example of a light distribution pattern of the vehicle head lamp according to the first embodiment and road surface drawing.
Figure 12B:
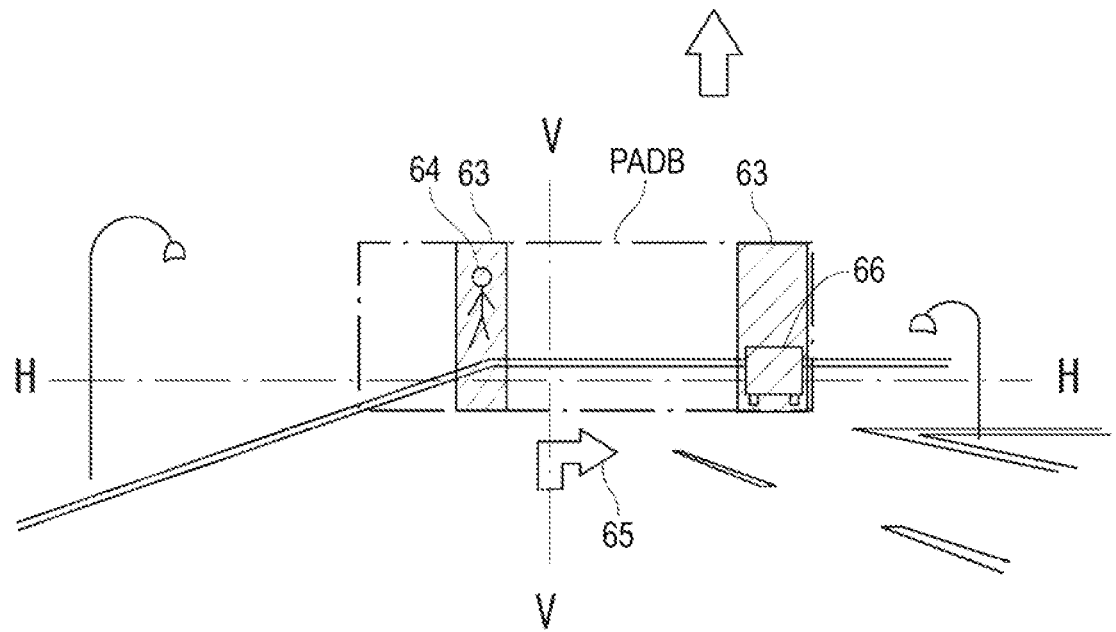
FIG. 12B is another example of a light distribution pattern of the vehicle head lamp according to the first embodiment and road surface drawing.

Next, a light distribution pattern and a drawing figure obtained by the right head lamp 1R and the left head lamp 1L are described. FIGS. 12A and 12B are light distribution patterns of the right head lamp 1R and the left head lamp 1L, and show examples of a light distribution pattern formed on a virtual vertical screen disposed at a position 25 m in front of the head lamp and a figure drawn on the road surface. In FIGS. 12A and 12B, a region indicated by oblique lines is a shield portion 63, which shows a state of not being irradiated with light.

As shown in FIG. 12A, a preceding vehicle 61 traveling in front is detected by signals from various vehicle surrounding information acquisition units provided in the vehicle C, and the ADB controller 55 performs lighting control of the light source 32 and rotation control of the rotary reflector 31 of the variable light distribution type optical unit ADB so as to form a light distribution pattern in which a region (shield portion 63) corresponding to position information of the preceding vehicle 61 is shielded. In addition, an inter-vehicle distance to the preceding vehicle 61 is grasped, and in order to draw a mark 62 indicating the inter-vehicle distance on the road surface, the figure drawing controller 53 performs lighting control of the light source 21 of the figure drawing optical unit RM and control of the light deflection device 24.

The light distribution pattern is not limited to this, and as shown in FIG. 12B, it is possible to detect a pedestrian 64, an oncoming vehicle 66, or the like and form a light distribution pattern including the shield portion 63 that turns off the region. Accordingly, glare to the pedestrian 64, the oncoming vehicle 66, or the like can be reduced. As for the drawn figure, as shown in FIG. 12B, various figures and characters such as a mark 65 that instructs a right or left turn corresponding to a planned course can be drawn on the road surface. Accordingly, it is possible to help safe traveling without causing a driver during driving to move his or her eyes.

(Operation Effects)

The irradiation range PADB of the variable light distribution type optical unit ADB is set slightly to the right from the center (vertical axis) in the right-left direction, namely close to the driver seat. When the irradiation range PADB for the high beam light distribution is disposed equally on the left and right of the vertical axis, in a case where a wall such as a protection wall of a mountain surface and a highway is present on a left side of the vehicle C, the wall is too bright (excessively irradiated with high beam light), and thus a facing lane side is relatively dark, and eyes of the driver are tired. As in the present embodiment, by shifting the optical axis (irradiation range PADB) of the variable light distribution type optical unit ADB to the driver seat side, the brightness becomes uniform as a whole, and a burden on the eyes of the driver is reduced.

In the right head lamp 1R and the left head lamp 1L, various optical units to be equipped are disposed bilaterally symmetrically, but the variable light distribution type optical unit ADB is disposed on the passenger seat side, and the figure drawing optical unit RM is disposed on the driver seat side. Effects when the figure drawing optical unit RM is disposed on the driver seat side are described using FIGS. 13A and 13B.

Figure 13A:
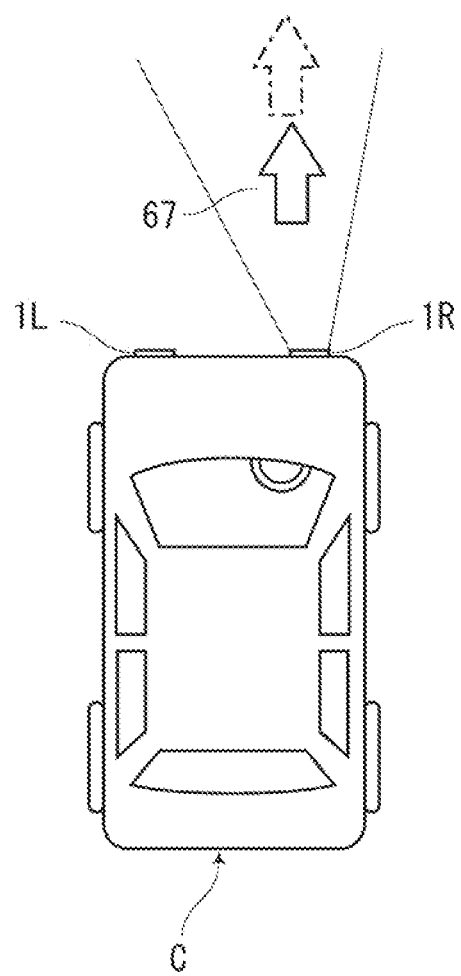
FIG. 13A is an illustrative view for illustrating an effect of the vehicle head lamp according to the first embodiment.
Figure 13B:
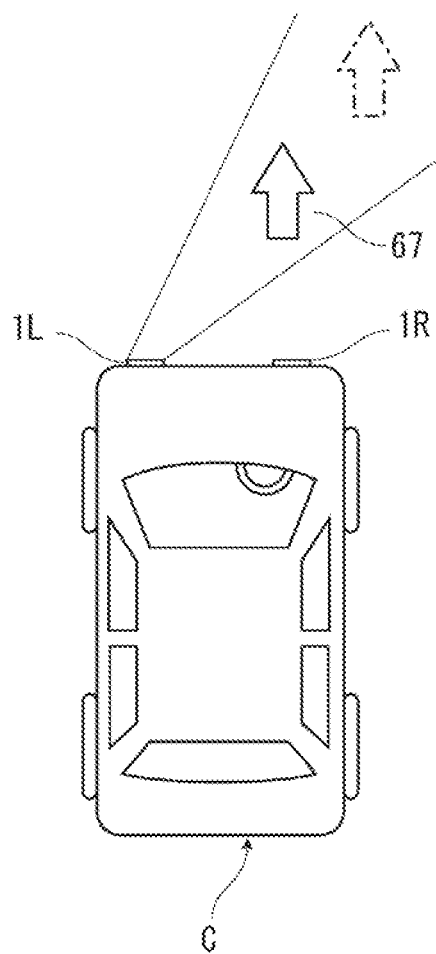
FIG. 13B is an illustrative view for illustrating an effect of the vehicle head lamp according to the first embodiment.

FIG. 13A is a plan view of the vehicle C in which the mark 67 is drawn in front of the vehicle by using the figure drawing optical unit RM, and shows a case (the present embodiment) where the figure drawing optical unit RM is equipped on the right head lamp 1R. FIG. 13B is a plan view of the vehicle in a case (comparative example) where the figure drawing optical unit RM is equipped on the left head lamp 1L.

When a figure to be drawn is used for calling attention of the driver, in a normal state, the figure is drawn not on a road surface in front of the center of the vehicle C but on a road surface in front of the driver seat on which the driver is present.

Both of FIGS. 13A and 13B show both a normal state (solid line) of the mark 67 drawn on the road surface and a state (alternate long and short dashed line) in which the vehicle C is displaced (pitched) in the upper-lower direction, such as when the vehicle C has climbed on a step or a gravel road.

As shown in FIG. 13A, when the figure drawing optical unit RM is equipped on the right head lamp 1R on the driver seat side, an influence of pitching is a degree that the mark 67 deviates in the front-rear direction, but as shown in FIG. 13B, in a case where the figure drawing optical unit RM is equipped on the left head lamp 1L on the passenger seat side, the mark 67 deviates not only in the front-rear direction but also in the left-right direction when there is pitching, so that an deviation amount is large, which promotes a sight line of the driver to move left and right and has a large influence. By mounting the figure drawing optical unit RM on the head lamp 1R on the driver seat side, the influence of pitching can be reduced. Further, when the mark 67 is drawn on the road surface, distortion of the drawing figure is small since the mark 67 is drawn on the front.

In addition, since the variable light distribution type optical unit ADB is disposed at a position corresponding to the figure drawing optical unit RM, the right head lamp 1R and the left head lamp 1L are bilaterally symmetrical, and the vehicle C is bilaterally symmetrical in a front view, which has a good appearance.

Second Embodiment

Next, a second embodiment is described. The same reference sign is attached to the same constituent as that in the first embodiment, and description thereof is omitted.

Figure 14:
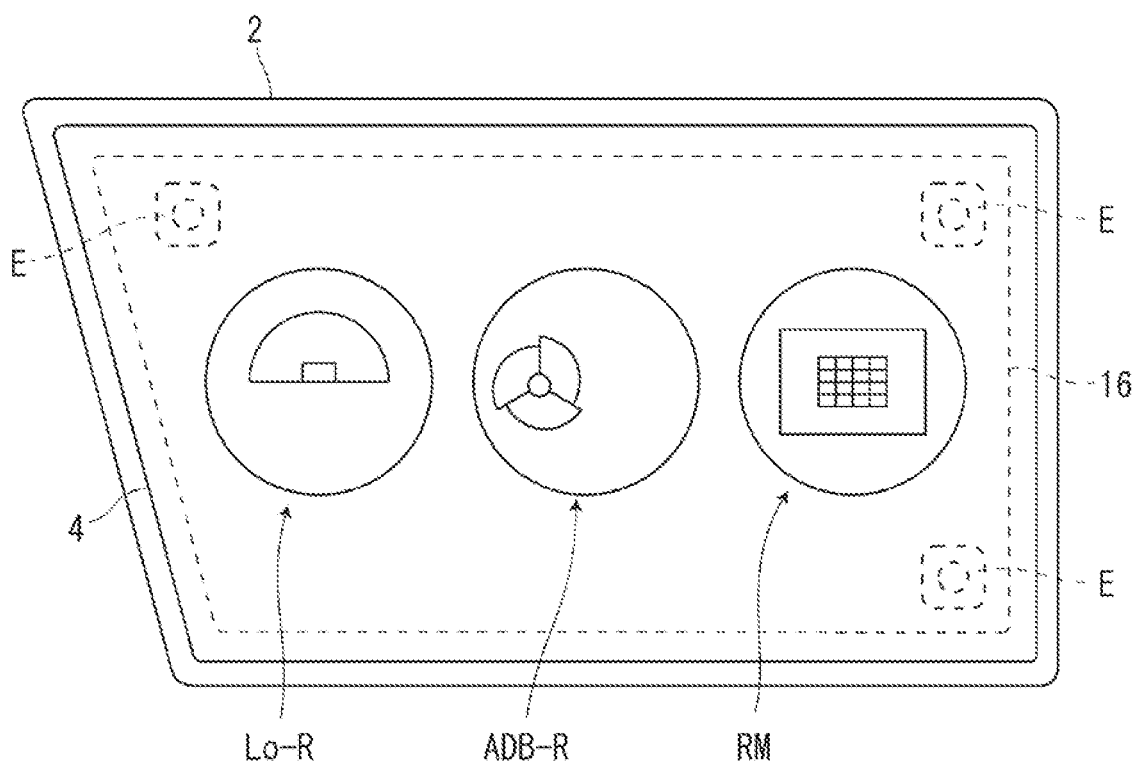
FIG. 14 is a front view of a vehicle head lamp (driver seat side) according to a second embodiment.
Figure 15:
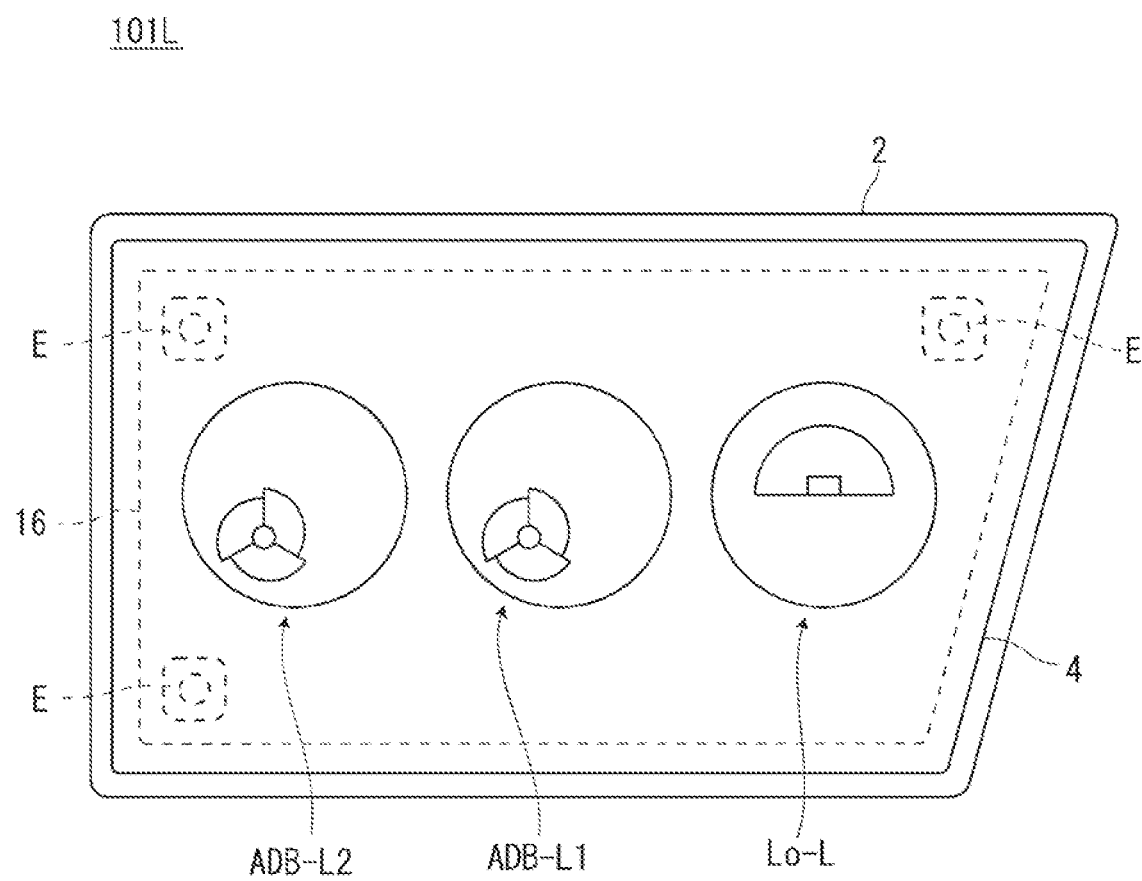
FIG. 15 is a front view of the vehicle head lamp (passenger seat side) according to the second embodiment.

FIG. 14 is a front view of a right head lamp 101R according to the second embodiment, and FIG. 15 is a front view of a left head lamp 101L according to the second embodiment.

Unlike the first embodiment, each of the right head lamp 101R and the left head lamp 101L houses three optical units in a lamp chamber.

A figure drawing optical unit RM, a variable light distribution type optical unit ADB-R, and a low beam optical unit Lo-R are housed in the lamp chamber of the right head lamp 101R in an order from a vehicle width direction inner side (left). A variable light distribution type optical unit ADB-L2, a variable light distribution type optical unit ADB-L1, and a low beam optical units Lo-L are housed in the lamp chamber of the left head lamp 1L in an order from a vehicle width direction inner side (right). The right head lamp 101R and the left head lamp 101L have bilaterally symmetrical external forms, and each optical unit provided therein is also bilaterally symmetrical.

In the right head lamp 101R and the left head lamp 101L, since variable light distribution type optical units ADB-R and ADB-L1 (an example of a second variable light distribution type optical unit) are supplemented respectively to the optical units also arranged in the first embodiment, three variable light distribution type optical units ADB-R, ADB-L1, and ADB-L2 are disposed for the two head lamps. All of the variable light distribution type optical units ADB-R, ADB-L1, and ADB-L2 have the same configuration as the variable light distribution type optical unit ADB described in the first embodiment, and are used to form a variable high beam light distribution.

Figure 16A:
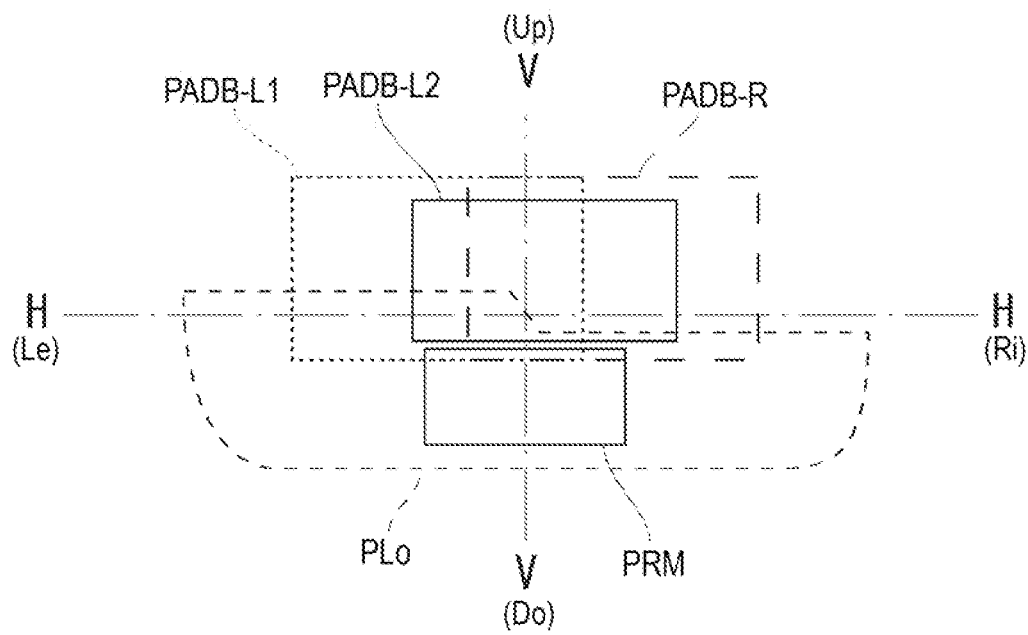
FIG. 16A is an example of an image diagram of an irradiation range of the vehicle head lamp according to the second embodiment.
Figure 16B:
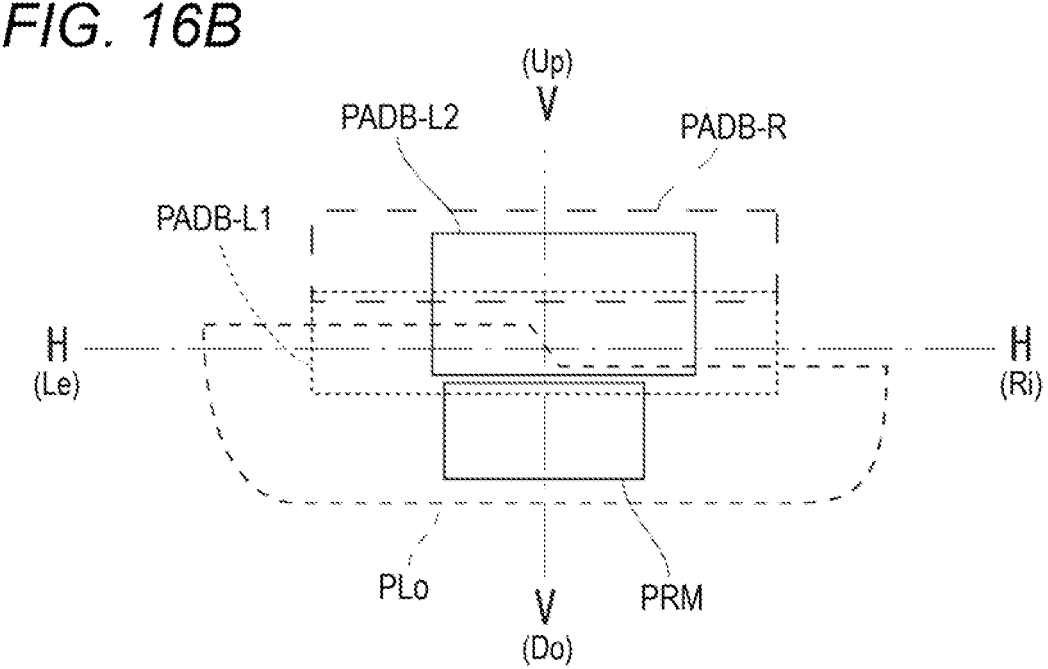
FIG. 16B is an example of an image diagram of an irradiation range of the vehicle head lamp according to the second embodiment.

FIGS. 16A and 16B are image diagrams of irradiation ranges of the right head lamp 101R and the left head lamp 101L having the above-described configuration.

As shown in FIG. 16A, an irradiation range PADB-R of the variable light distribution type optical unit ADB-R, an irradiation range PADB-L1 of the variable light distribution type optical unit ADB-L1, and an irradiation range PADB-L2 of the variable light distribution type optical unit ADB-L2 are located in an upper region of an irradiation range PLo corresponding to a low beam region, a composite region thereof corresponds to a region above the horizontal line on a virtual vertical screen and a central region including a vertical line, namely a high beam region.

The irradiation range PADB-L1 mainly irradiates a left side of the high beam region, the irradiation range PADB-R mainly irradiates a right side of the high beam region, and the irradiation range PADB-L2 irradiates the center of the high beam region slightly to the right side. The respective regions overlap each other.

The irradiation range PRM is bilaterally uniform with the vertical axis as the center in the horizontal direction and below the horizontal line in the vertical direction, and a region thereof falls within the low beam region.

A variable high beam light distribution pattern is formed by the variable light distribution type optical units ADB-R, ADB-L1, and ADB-L2. Since a plurality of optical units are used, it is possible to obtain a light distribution having a higher luminous intensity than that of the first embodiment.

In the present embodiment, the irradiation range PADB-R and the irradiation range PADB-L1 forming the high beam light distribution are configured to overlap each other in the vicinity of the center, a combined irradiation range of the two is not limited to the above configuration as long as it includes a region above the horizontal line on the virtual vertical screen. For example, as shown in FIG. 16B, the irradiation range PADB-R may be configured to irradiate the upper side of the high beam region to left and right ends, and the irradiation range PADB-L1 may also be configured to irradiate the high beam region to the left and right ends below the irradiation range PADB-R.

Third Embodiment

Next, a third embodiment is described. The same reference sign is attached to the same constituent as that in the first embodiment, and description thereof is omitted.

Figure 17:
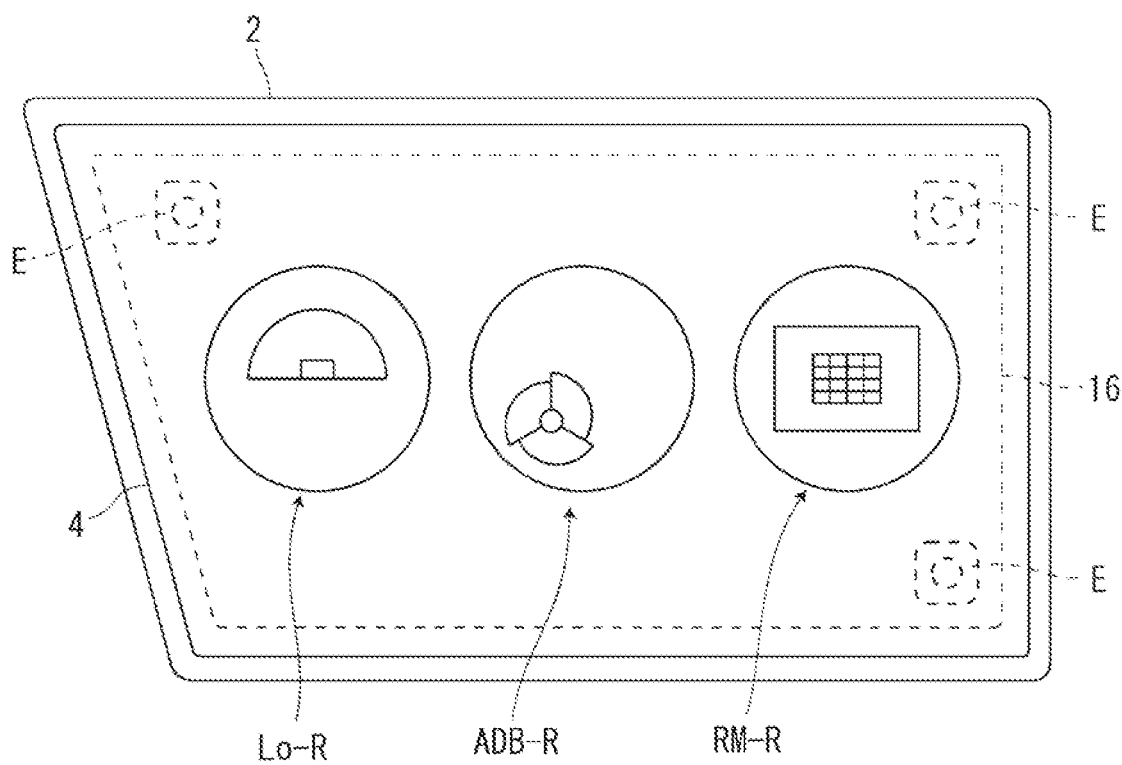
FIG. 17 is a front view of a vehicle head lamp (driver seat side) according to a third embodiment.
Figure 18:
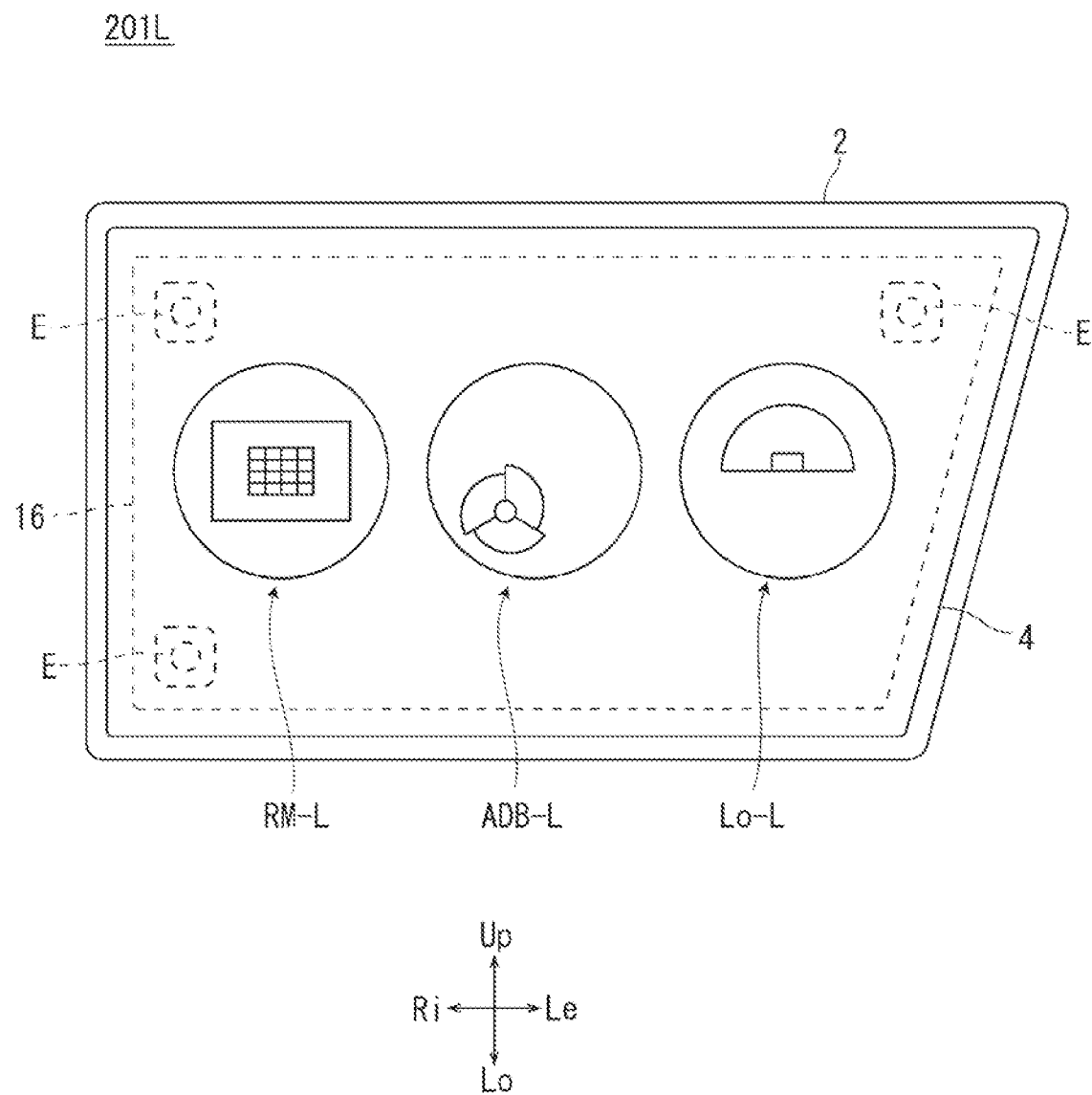
FIG. 18 is a front view of the vehicle head lamp (passenger seat side) according to the third embodiment.

FIG. 17 is a front view of a right head lamp 201R according to the third embodiment, and FIG. 18 is a front view of a left head lamp 201L according to the third embodiment.

As the second embodiment, each of the right head lamp 101R and the left head lamp 101L houses three optical units in a lamp chamber.

A figure drawing optical unit RM-R, a variable light distribution type optical unit ADB-R, and a low beam optical unit Lo-R are housed in the lamp chamber of the right head lamp 201R in an order from a vehicle width direction inner side (left). A figure drawing optical unit RM-L, a variable light distribution type optical unit ADB-L, and a low beam optical units Lo-L are housed in the lamp chamber of the left head lamp 1L in an order from a vehicle width direction inner side (right). The right head lamp 201R and the left head lamp 201L have bilaterally symmetrical external forms, and each optical unit provided therein is also bilaterally symmetrical.

All of the variable light distribution type optical units ADB-R and ADB-L have the same configuration as the variable light distribution type optical unit ADB described in the first embodiment, and are used to form a variable high beam light distribution.

Similarly, the figure drawing optical units RM-R and RM-L have the same configuration as the figure drawing optical unit RM described in the first embodiment, but the figure drawing optical unit RM-R of the right head lamp 201R on the driver seat side is used to draw predetermined figures and characters on the road surface, and the figure drawing optical unit RM-L of the left head lamp 201L on the passenger seat side is used to form a variable high beam light distribution. Since the figure drawing optical unit RM is a device that forms an optional pattern with light, it is possible to form a desired light distribution pattern by ON/OFF control of each minor element 71 or to form a shield portion at a desired position in the light distribution pattern. That is, the variable high beam light distribution is formed by three optical units of the variable light distribution type optical units ADB-R and ADB-L and a figure drawing optical unit RM-M.

Figure 19:
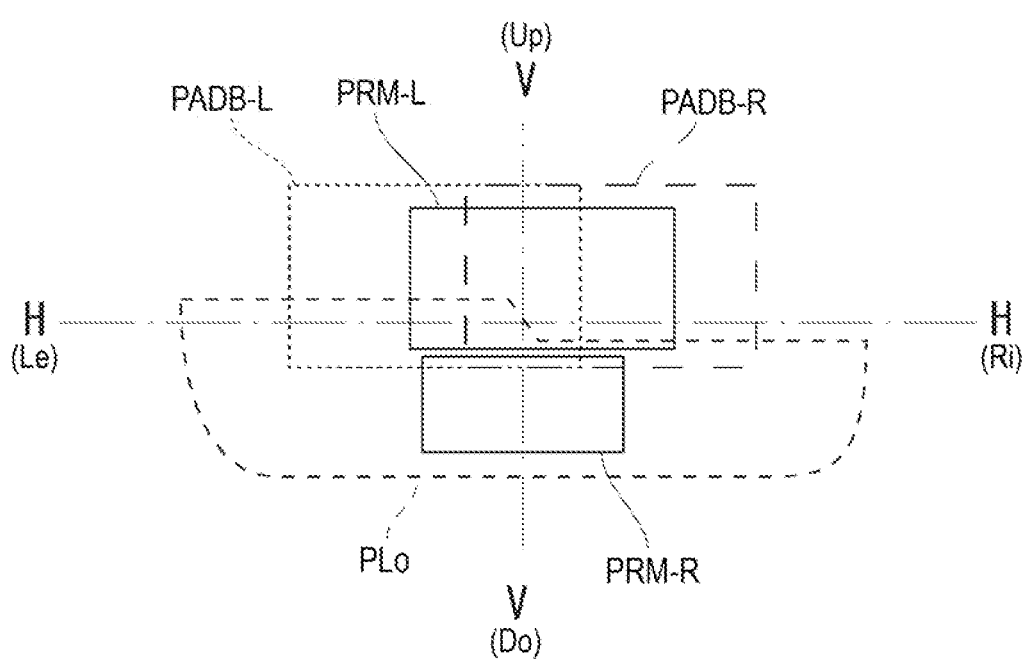
FIG. 19 is an image diagram of an irradiation range of the vehicle head lamp according to the third embodiment.

FIG. 19 is an image diagram of irradiation ranges of the right head lamp 201R and the left head lamp 201L having the above-described configuration. An irradiation range PADB-R of the variable light distribution type optical unit ADB-R, an irradiation range PADB-L of the variable light distribution type optical unit ADB-L, and an irradiation range PRM-L of the figure drawing optical unit RM-L are located in an upper region of an irradiation range PLo corresponding to a low beam region, a composite region thereof corresponds to a region above the horizontal line on a virtual vertical screen and a central region including a vertical line, namely a high beam region.

The irradiation range PADB-L mainly irradiates a left side of the high beam region, the irradiation range PADB-R mainly irradiates a right side of the high beam region. Further, the irradiation range PRM-L is above the horizontal axis, includes a vertical line, and is slightly to the right of the center. The respective regions overlap each other.

In the irradiation range PRM-R of the figure drawing optical unit RM-R, irradiation is performed at substantially the center in the horizontal direction and below the horizontal line in the vertical direction. The drawing optical unit RM-L helps to form a variable high beam light distribution by setting an optical axis thereof above the horizontal line, and the figure drawing optical unit RM-R can draw a predetermined figure on the road surface in front of the head lamp by setting an optical axis thereof below the horizontal line.

The figure drawing optical units RM-L and RM-R have the same constituent elements, but the irradiation range PRM-R is configured to be narrower than the irradiation range PRM-L. This is performed by setting the irradiation range narrow by adjusting an angle of a wide angle of the projection lens including a unit, or the like, and a resolution per unit area of the irradiated figure can be made high and the luminous intensity can be made high. It is possible to call high attention of the driver by a clear drawing figure having a high luminous intensity.

The same effect can be obtained even by configuring the light source luminance of the figure drawing optical unit RM-R to be higher than the luminance of the figure drawing optical unit RM-L. In addition, by setting the number of mirror elements included in the figure drawing optical unit RM-R larger than the number of mirror elements included in the figure drawing optical unit RM-L, it is possible to increase a resolution of the drawing figure and make finer depiction possible, and the same effect can be obtained.

In each embodiment, the vehicle C is a right handle specification, but in a left handle specification, configurations of the right head lamp 1R and the left head lamp 1L can correspond by being reversed in the left-right direction.

While preferable embodiments of the present invention have been described, the above embodiments are examples of the present invention, and these embodiments can be combined based on knowledge of those skilled in the art, and such forms are also included in the scope of the present invention.

The present application is based on Japanese Patent Application No. 2018-185478 filed on Sep. 28, 2018, contents of which are incorporated herein as reference.

The invention claimed is:

1. A pair of left and right vehicle head lamps each including a plurality of optical units in a lamp chamber, wherein
a first variable light distribution type optical unit that changes a light distribution mode of a high beam depending on a surrounding state and a traveling state of a vehicle is disposed in a first vehicle head lamp on a passenger seat side,
a figure drawing optical unit capable of forming a desired figure on a road surface in front of the vehicle by emitted light is disposed at a position symmetrical to the first variable light distribution type optical unit in a second vehicle head lamp on a driver seat side,
a second variable light distribution type optical unit that changes the light distribution mode of the high beam depending on the surrounding state and the traveling state of the vehicle is disposed in the second vehicle head lamp on the driver seat side, and
a third variable light distribution type optical unit that changes light distribution mode of the high beam depending on the surrounding state and the traveling state of the vehicle is disposed at a position symmetrical to the second variable light distribution type optical unit in the first vehicle head lamp on the passenger seat side.

2. The vehicle head lamp according to claim 1, wherein the figure drawing optical unit and the first variable light distribution type optical unit are reflection devices whose surfaces are provided with a plurality of reflection elements arranged in a matrix form, and the reflection elements are capable of selectively reflecting incident light individually.

3. The vehicle head lamp according to claim 2, wherein a number of reflection elements of the figure drawing optical unit is larger than a number of reflection elements of the first variable light distribution optical unit.

4. The vehicle head lamp according to claim 2, wherein an irradiation range of the figure drawing optical unit on the virtual screen is configured to be narrower than an irradiation range of the first variable light distribution optical unit on the virtual screen.

5. The vehicle head lamp according to claim 2, wherein a figure formed on the virtual screen by the figure drawing optical unit has higher luminance than luminance of a figure formed on the virtual screen by the first variable light distribution optical unit.

6. The vehicle head lamp according to claim 1, wherein an optical axis of the figure drawing optical unit is set below a horizontal axis of a virtual screen, and an optical axis of the first variable light distribution optical unit is set above a horizontal axis of the virtual screen.

7. The vehicle head lamp according to claim 1, wherein an optical axis of the figure drawing optical unit is set on a vertical axis of a virtual screen, and
an optical axis of the first variable light distribution type optical unit is set toward a driver seat side from a vertical axis of the virtual screen.

8. The vehicle head lamp according to claim 1, wherein luminance of a light source constituting the figure drawing optical unit is configured to be higher than luminance of a light source constituting the first variable light distribution optical unit.

9. The vehicle head lamp according to claim 1, wherein a low beam light distribution optical unit forming a low beam light distribution pattern is further disposed in the first vehicle head lamp.

10. The vehicle head lamp according to claim 1, wherein an irradiation range of the figure drawing optical unit is disposed entirely below a horizontal axis of a virtual screen.

* * * * *